United States Patent
Panteleev et al.

(10) Patent No.: US 12,464,516 B2
(45) Date of Patent: Nov. 4, 2025

(54) PHYSICAL UPLINK SHARED CHANNEL ENHANCEMENTS FOR NEW RADIO ULTRA-RELIABLE LOW-LATENCY COMMUNICATION

(71) Applicant: Apple Inc., Cupertino, CA (US)

(72) Inventors: Sergey Panteleev, Nizhny Novgorod (RU); Debdeep Chatterjee, San Jose, CA (US); Toufiqul Islam, Santa Clara, CA (US); Fatemeh Hamidi-Sepehr, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 534 days.

(21) Appl. No.: 17/267,127

(22) PCT Filed: Aug. 9, 2019

(86) PCT No.: PCT/US2019/045828
§ 371 (c)(1),
(2) Date: Feb. 9, 2021

(87) PCT Pub. No.: WO2020/033785
PCT Pub. Date: Feb. 13, 2020

(65) Prior Publication Data
US 2021/0314982 A1 Oct. 7, 2021

Related U.S. Application Data

(60) Provisional application No. 62/737,526, filed on Sep. 27, 2018, provisional application No. 62/717,659, filed on Aug. 10, 2018.

(51) Int. Cl.
*H04W 72/1268* (2023.01)
*H04W 72/23* (2023.01)

(52) U.S. Cl.
CPC ....... *H04W 72/1268* (2013.01); *H04W 72/23* (2023.01)

(58) Field of Classification Search
CPC ............. H04W 72/1268; H04W 72/23; H04W 72/231; H04W 72/232; H04W 72/512;
(Continued)

(56) References Cited

U.S. PATENT DOCUMENTS

| 10,034,275 B2 | 7/2018 | Kim et al. |
| 2015/0282208 A1 | 10/2015 | Yi et al. |

(Continued)

FOREIGN PATENT DOCUMENTS

| WO | 2013138674 A1 | 11/2014 |
| WO | 2016171765 A1 | 3/2018 |

OTHER PUBLICATIONS

International Search Report dated Nov. 29, 2019 for International Application No. PCT/US2019/045828.
(Continued)

*Primary Examiner* — Kan Yuen
(74) *Attorney, Agent, or Firm* — Eschweiler & Potashnik, LLC; Ningjiao Zhang

(57) ABSTRACT

A network device (e.g., a user equipment (UE), a new radio NB (gNB), or other network component) can process or generate a dynamic Physical Uplink Shared Channel (PUSCH) repetition indication that provides parameters about PUSCH repetition(s) for the uplink within one, two or other number of slots of a New Radio (NR) communication as an Ultra-Reliable Low-Latency Communication. The network device can also process or generate one or more multiple Configuration-Grant (CG) PUSCH configurations. The presence of a repetition level bit-field in a Downlink Control Information (DCI) carrying UL grant or activating UL configured grant PUSCH can be controlled by semi-
(Continued)

static UE-specific RRC signaling enabling or disabling the dynamic signaling of PUSCH repetitions.

20 Claims, 7 Drawing Sheets

(58) Field of Classification Search
CPC ... H04L 5/0044; H04L 5/0053; H04L 5/0094; H04L 5/0098; H04L 1/08
See application file for complete search history.

(56) References Cited

U.S. PATENT DOCUMENTS

| | | | |
|---|---|---|---|
| 2016/0182199 A1 | 6/2016 | Webb et al. | |
| 2017/0201989 A1 | 7/2017 | Fakoorian et al. | |
| 2018/0184468 A1 | 6/2018 | Chien et al. | |
| 2018/0279327 A1* | 9/2018 | Ying | H04W 72/0446 |
| 2018/0332539 A1 | 11/2018 | Fan et al. | |
| 2019/0342921 A1* | 11/2019 | Loehr | H04L 5/0053 |
| 2020/0052827 A1* | 2/2020 | Vilaipornsawai | H04L 5/0044 |
| 2020/0288464 A1* | 9/2020 | Luo | H04W 72/1268 |
| 2020/0359425 A1* | 11/2020 | Chen | H04W 76/11 |
| 2021/0014008 A1* | 1/2021 | Takeda | H04L 1/0001 |
| 2021/0014881 A1* | 1/2021 | Aiba | H04B 7/0626 |
| 2021/0068114 A1* | 3/2021 | Xu | H04W 72/0446 |
| 2021/0076409 A1* | 3/2021 | Goto | H04W 72/1268 |
| 2021/0167930 A1* | 6/2021 | Jeon | H04L 5/0098 |
| 2021/0176018 A1* | 6/2021 | Bai | H04W 72/535 |
| 2021/0184819 A1* | 6/2021 | Takeda | H04W 24/10 |
| 2021/0185718 A1* | 6/2021 | Ying | H04L 1/0061 |
| 2021/0212105 A1* | 7/2021 | Takeda | H04W 72/23 |
| 2021/0219271 A1* | 7/2021 | Takeda | H04L 1/189 |
| 2021/0219333 A1* | 7/2021 | Xu | H04W 72/0453 |
| 2021/0235503 A1* | 7/2021 | Irukulapati | H04W 74/0833 |
| 2021/0250970 A1* | 8/2021 | Ekpenyong | H04W 72/1268 |
| 2021/0274534 A1* | 9/2021 | Takeda | H04L 5/0053 |
| 2021/0298052 A1* | 9/2021 | Namba | H04L 1/1851 |
| 2021/0377979 A1* | 12/2021 | Bhamri | H04W 72/0446 |
| 2022/0015070 A1* | 1/2022 | Chen | H04W 72/23 |
| 2022/0053541 A1* | 2/2022 | Lei | H04W 72/23 |
| 2022/0086882 A1* | 3/2022 | Takeda | H04L 5/0096 |
| 2022/0210824 A1* | 6/2022 | Ying | H04W 76/20 |
| 2022/0248453 A1* | 8/2022 | Aiba | H04L 5/0094 |
| 2022/0353711 A1* | 11/2022 | Ying | H04W 72/1263 |

OTHER PUBLICATIONS

"PUSCH reliability for URLLC." Source: Huawei, HiSilicon. Agenda Item: 7.1.3.3.4. 3GPP TSG RAN WG1 Meeting #93, Busan, Korea, May 21-25, 2018. R1-1806902.

"Remaining issues on UL data transmission for URLLC." Source: vivo. Agenda Item: 7.1.3.3.4. 3GPP TSG RAN WG1 Meeting #92bis, Busan, Korea, May 21-25, 2018. R1-1806070.

Summary of 7.1.3.31 (resource allocation). Source: Ericsson. Agenda Item: 7.1.3.3.1. TSG-RAN WG1 #93, Busan, Korea, May 21-25, 2018. R1-1807622.

International Preliminary Report on Patentability dated Feb. 16, 2021 for International Application No. PCT/US2019/045828.

3rd Generation Partnership Project; Technical Specification Group Radio Access Network; NR; Physical layer procedures for data; (Release 15); 3GPP TS 38.214 V15.1.0 (Mar. 2018); http://www.3gpp.org.

* cited by examiner

Message Box 1: RRC Message Modification including the repetition mapping type

```
-- ASN1START
-- TAG-PUSCH-TIMEDOMAINRESOURCEALLOCATIONLIST-START

PUSCH-TimeDomainResourceAllocationList ::=    SEQUENCE (SIZE(1..maxNrofUL-Allocations)) OF
PUSCH-TimeDomainResourceAllocation PUSCH-TimeDomainResourceAllocation ::=    SEQUENCE {
    k2                      INTEGER(0..32)              OPTIONAL,    -- Need S
    mappingType             ENUMERATED {typeA, typeB},
    startSymbolAndLength    INTEGER (0..127)
    repetitionType          ENUMERATED {typeA, typeB}   OPTIONAL,
}

-- TAG-PUSCH-TIMEDOMAINRESOURCEALLOCATIONLIST-STOP
-- ASN1STOP
```

FIG. 4

PHYSICAL UPLINK SHARED CHANNEL ENHANCEMENTS FOR NEW RADIO ULTRA-RELIABLE LOW-LATENCY COMMUNICATION

REFERENCE TO RELATED APPLICATIONS

This application is a National Phase entry application of International Patent Application No. PCT/US2019/045828 filed Aug. 9, 2019, which claims priority to U.S. Provisional Application No. 62/717,659 filed Aug. 10, 2018, entitled "SYSTEM AND METHODS ON PHYSICAL UPLINK SHARED CHANNEL ENHANCEMENTS FOR NEW RADIO ULTRA-RELIABLE LOW-LATENCY COMMUNICATION", and the benefit of U.S. Provisional Application No. 62/737,526 filed Sep. 27, 2018, entitled "PHYSICAL UPLINK SHARED CHANNEL ENHANCEMENTS FOR NEW RADIO ULTRA-RELIABLE LOW-LATENCY COMMUNICATION", and is hereby incorporated by reference in its entirety.

FIELD

The present disclosure relates to wireless technology and more specifically to physical uplink shared channel (PUSCH) enhancements for new radio (NR) ultra-reliable low-latency communications.

BACKGROUND

Mobile communication has evolved significantly from early voice systems to today's highly sophisticated integrated communication platform. The next generation wireless communication system, 5G, or new radio (NR) will provide access to information and sharing of data anywhere, anytime by various users and applications. NR is expected to be a unified network/system that target to meet vastly different and sometime conflicting performance dimensions and services. Such diverse multi-dimensional requirements are driven by different services and applications. In general, NR will evolve based on 3GPP LTE-Advanced with additional potential new Radio Access Technologies (Rats) to enrich people lives with better, simple and seamless wireless connectivity solutions. NR will enable everything connected by wireless and deliver fast, rich contents and services.

Recently, the first release on NR (5G) specification provided a baseline set of features and components for future cellular communication systems. It also supports the aspects of ultra-reliable low latency communication (URLLC) by means of flexible resources allocation, scheduling & hybrid automatic repeat request (HARQ), low spectrum efficiency transmission parameters, etc. In Release 16, the baseline URLLC functionality is needs to be enhanced, where one of the design directions is to further improve reliability and latency of PUSCH transmission.

BRIEF DESCRIPTION OF THE DRAWINGS

FIG. 4 is a diagram illustrating example RRC message modification including repetition mapping type in accordance with various aspects/embodiments described herein.

DETAILED DESCRIPTION

Figure 1:
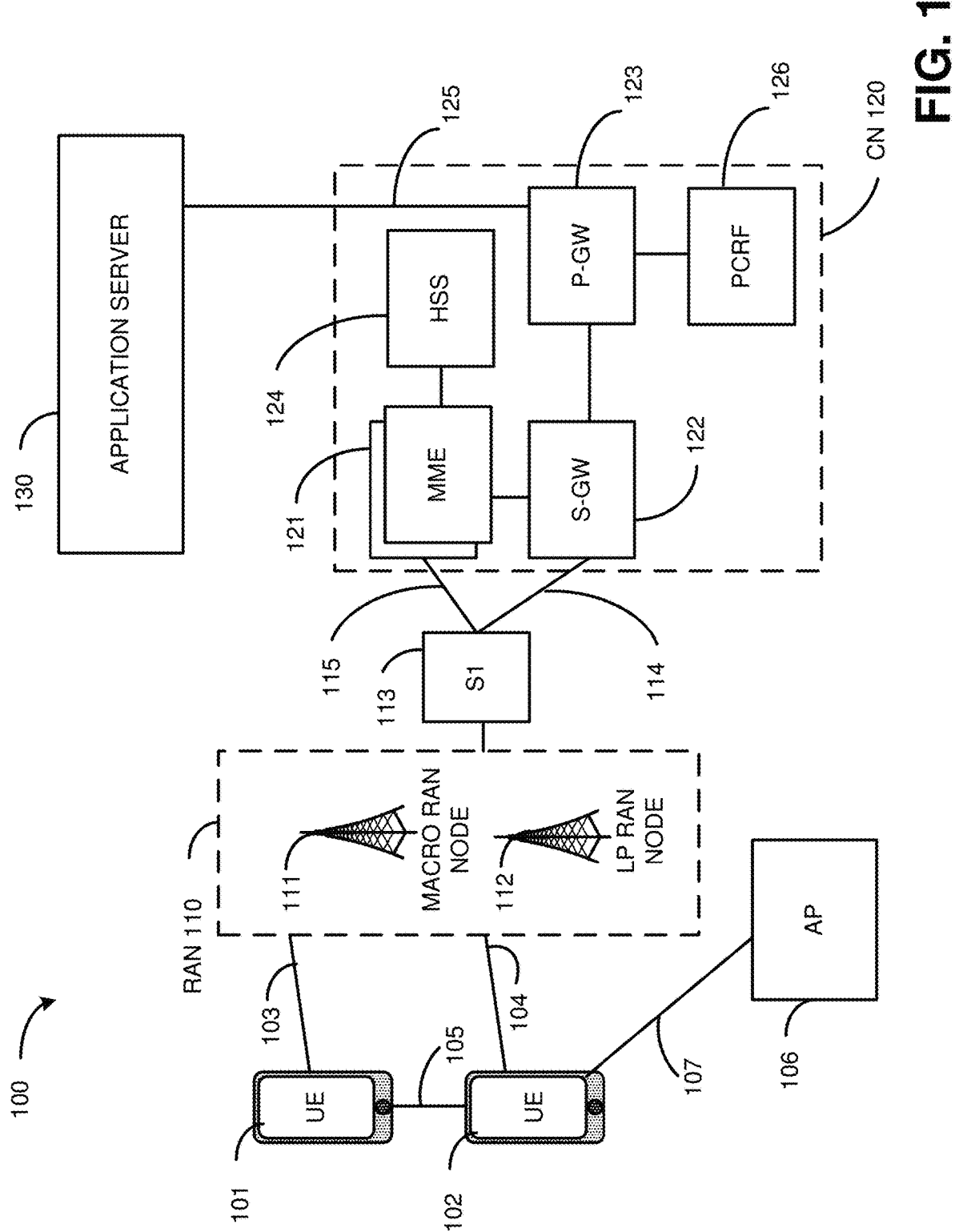
FIG. 1 is a block diagram illustrating an example of user equipment(s) (UEs) and gNBs or access nodes in a network with network components useable in connection with various aspects described herein.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items may be distinct or they may be the same, although in some situations the context may indicate that they are distinct or that they are the same.

As used herein, the term "circuitry" may refer to, be part of, or include an Application Specific Integrated Circuit (ASIC), an electronic circuit, a processor (shared, dedicated, or group), or associated memory (shared, dedicated, or group) operably coupled to the circuitry that execute one or more software or firmware programs, a combinational logic circuit, or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Embodiments described herein can be implemented into a system or network device using any suitably configured hardware and/or software. FIG. 1 illustrates an architecture of a system 100 of a network in accordance with some embodiments. The system 100 is illustrated to include a UE 101 and a UE 102, which can further represent new radio (NR) devices (e.g., a UE or gNB) or the like as discussed herein.

FIG. 1 illustrates an architecture of a system 100 of a network in accordance with some embodiments. The system 100 is shown to include a user equipment (UE) 101 and a UE 102. As used herein, the term "user equipment" or "UE" may refer to a device with radio communication capabilities and may describe a remote user of network resources in a communications network. The term "user equipment" or "UE" may be considered synonymous to, and may be referred to as client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface. In this example, UEs 101 and 102 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, machine-type communications (MTC) devices, machine-to-machine (M2M), Internet of Things (IoT) devices, and/or the like In some embodiments, any of the UEs 101 and 102 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections (or channels) 103 and 104, respectively, each of which comprises a physical communications interface or layer (discussed in further detail infra). As used herein, the term "channel" may refer to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" may refer to a connection between two devices through a Radio Access Technology (RAT) for the purpose of transmitting and receiving information. In this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 101 and 102 may further directly exchange communication data via a ProSe interface 105. The ProSe interface 105 may alternatively be referred to as a sidelink (SL) interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH). In various implementations, the SL interface 105 may be used in vehicular applications and communications technologies, which are often referred to as V2X systems. V2X is a mode of communication where UEs (for example, UEs 101, 102) communicate with each other directly over the PC5/SL interface 105 and can take place when the UEs 101, 102 are served by RAN nodes 111, 112 or when one or more UEs are outside a coverage area of the RAN 110. V2X may be classified into four different types: vehicle-to-vehicle (V2V), vehicle-to-infrastructure (V2I), vehicle-to-network (V2N), and vehicle-to-pedestrian (V2P). These V2X applications can use "co-operative awareness" to provide more intelligent services for end-users. For example, vehicle UEs (vUEs) 101, 102, RAN nodes 111, 112, application servers 130, and pedestrian UEs 101, 102 may collect knowledge of their local environment (for example, information received from other vehicles or sensor equipment in proximity) to process and share that knowledge in order to provide more intelligent services, such as cooperative collision warning, autonomous driving, and the like. In these implementations, the UEs 101, 102 may be implemented/employed as Vehicle Embedded Communications Systems (VECS) or vUEs.

The UE 102 is shown to be configured to access an access point (AP) 106 (also referred to as "WLAN node 106", "WLAN 106", "WLAN Termination 106" or "WT 106" or the like) via connection 107. The connection 107 can comprise a local wireless connection, such as a connection consistent with any IEEE 802.11 protocol, wherein the AP 106 would comprise a wireless fidelity (WiFi®) router. In this example, the AP 106 is shown to be connected to the Internet without connecting to the core network of the wireless system (described in further detail below). In various embodiments, the UE 102, RAN 110, and AP 106 may be configured to utilize LTE-WLAN aggregation (LWA) operation and/or WLAN LTE/WLAN Radio Level Integration with IPsec Tunnel (LWIP) operation. The LWA operation may involve the UE 102 in RRC_CONNECTED being configured by a RAN node 111, 112 to utilize radio resources of LTE and WLAN. LWIP operation may involve the UE 102 using WLAN radio resources (e.g., connection 107) via Internet Protocol Security (IPsec) protocol tunneling to authenticate and encrypt packets (e.g., internet protocol (IP) packets) sent over the connection 107. IPsec tunneling may include encapsulating entirety of original IP packets and adding a new packet header, thereby protecting the original header of the IP packets.

The RAN 110 can include one or more access nodes that enable the connections 103 and 104. As used herein, the terms "access node," "access point," or the like may describe equipment that provides the radio baseband functions for data and/or voice connectivity between a network and one or more users. These access nodes can be referred to as base stations (BS), NodeBs, evolved NodeBs (eNBs), next Generation NodeBs (gNB), RAN nodes, Road Side Units (RSUs), and so forth, and can comprise ground stations (e.g., terrestrial access points) or satellite stations providing coverage within a geographic area (e.g., a cell). The term "Road Side Unit" or "RSU" may refer to any transportation infrastructure entity implemented in or by a gNB/eNB/RAN node or a stationary (or relatively stationary) UE, where an RSU implemented in or by a UE may be referred to as a "UE-type RSU", an RSU implemented in or by an eNB may be referred to as an "eNB-type RSU." The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some embodiments, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management.

In accordance with some embodiments, the UEs 101 and 102 can be configured to communicate using Orthogonal Frequency-Division Multiplexing (OFDM) communication signals with each other or with any of the RAN nodes 111 and 112 over a multicarrier communication channel in accordance with various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 111 and 112 to the UEs 101 and 102, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 101 and 102. The physical downlink control channel (PDCCH) may carry information about the transport format and resource allocations related to the PDSCH channel, among other things. It may also inform the UEs 101 and 102 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 111 and 112 based on channel quality information fed back from any of the UEs 101 and 102. The downlink resource assignment information may be sent on the PDCCH used for (e.g., assigned to) each of the UEs 101 and 102.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, 8, etc.).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced control channel elements (ECCEs). Similar to above, each ECCE may correspond to nine sets of four physical resource elements known as an enhanced resource element groups (EREGs). An ECCE may have other numbers of EREGs in some situations.

The RAN 110 is shown to be communicatively coupled to a core network (CN) 120 via an S1 interface 113. In embodiments, the CN 120 may be an evolved packet core (EPC) network, a NextGen Packet Core (NPC) network, or some other type of CN. In this embodiment the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this embodiment, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities may include lawful intercept, charging, and some policy enforcement.

The P-GW 123 may terminate an SGi interface toward a PDN. The P-GW 123 may route data packets between the EPC network 120 and external networks such as a network including the application server 130 (alternatively referred to as application function (AF)) via an Internet Protocol (IP) interface 125. Generally, the application server 130 may be an element offering applications that use IP bearer resources with the core network (e.g., UMTS Packet Services (PS) domain, LTE PS data services, etc.). In this embodiment, the P-GW 123 is shown to be communicatively coupled to an application server 130 via an IP communications interface 125. The application server 130 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 130 via the P-GW 123. The application server 130 may signal the PCRF 126 to indicate a new service flow and select the appropriate Quality of Service (QoS) and charging parameters. The PCRF 126 may provision this rule into a Policy and Charging Enforcement Function (PCEF) (not shown) with the appropriate traffic flow template (TFT) and QoS class of identifier (QCI), which commences the QoS and charging as specified by the application server 130.

Figure 2:
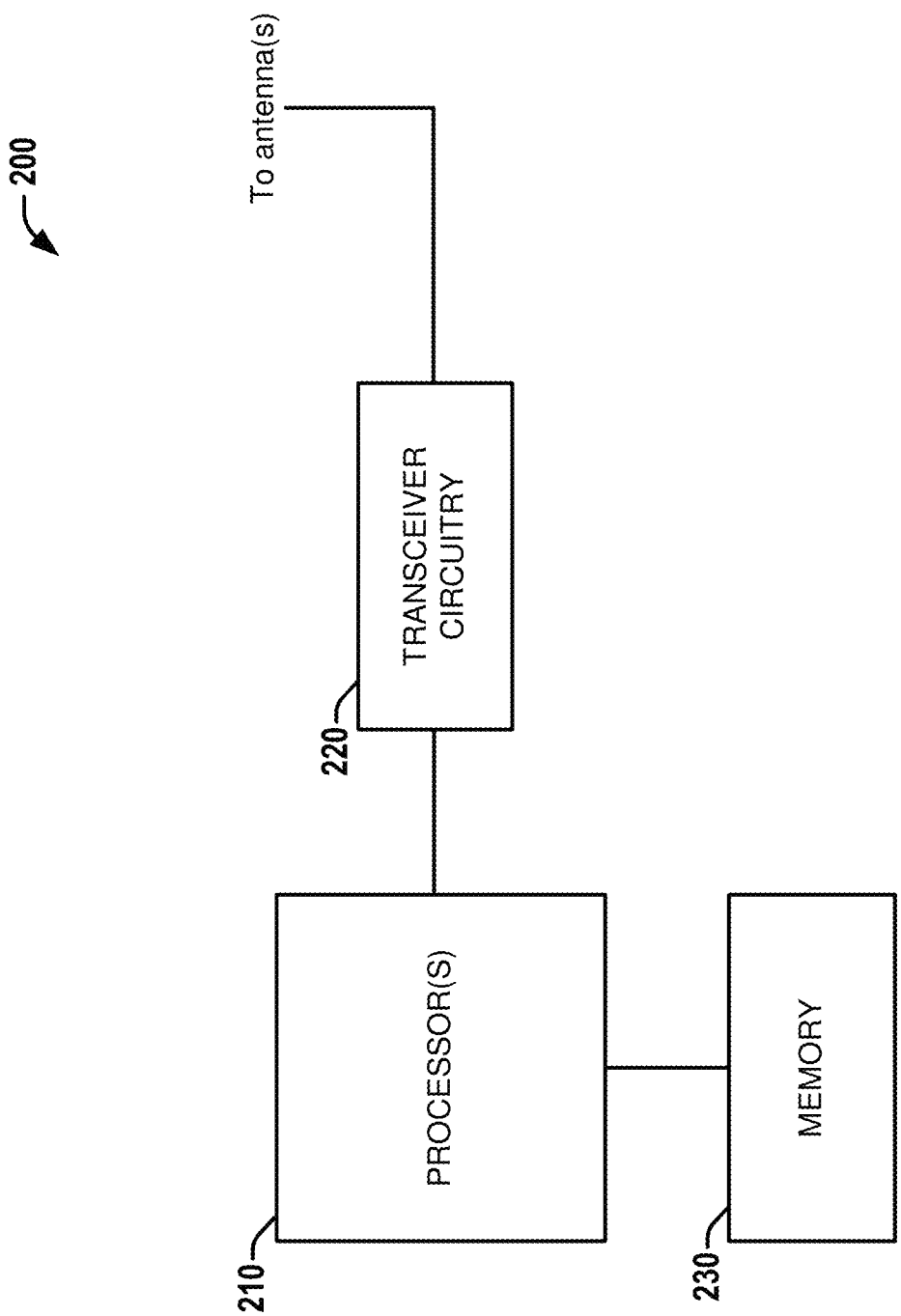
FIG. 2 is a block diagram illustrating a system employable at a UE or gNB, according to various aspects described herein.

Referring to FIG. 2, illustrated is a block diagram of a system/device 200 employable at a UE (e.g., URLLC UEs, or non-URLLC UEs) or other network device (e.g., gNB/eNB) that facilitates one or more aspects/embodiments herein. System 200 can include one or more processors 210 (e.g., one or more baseband processors such as one or more of the baseband processors discussed in connection with the other FIGs.) comprising processing circuitry and associated interface(s), transceiver circuitry 220 (e.g., comprising part or all of RF circuitry, which can comprise transmitter circuitry (e.g., associated with one or more transmit chains) and/or receiver circuitry (e.g., associated with one or more receive chains) that can employ common circuit elements, distinct circuit elements, or a combination thereof), and a memory 230 (which can comprise any of a variety of storage mediums and can store instructions and/or data associated with one or more of processor(s) 210 or transceiver circuitry 220).

In various embodiments/aspects described herein an enhanced PUSCH transmission can be configured, generated, processed, communicated, transmitted or received for example depending on the network device or component. In particular, various embodiment are directed to UE behavior and signaling of dynamic PUSCH repetition factor in Downlink Control Information (DCI) (e.g., as in Release 16), which can be in contrast to semi-static operation of repetition in NR communication (in a previous Release of related 3GPP standards); inter-bandwidth part (BWP) frequency hopping; transport block size (TBS) scaling; and enhanced configured grant (CG) UL transmission. Enhanced CG UL can be renamed from Semi-Persistent Scheduling (SPS) in previous LTE scheduling, but now in NR considered CG for UL while in DL as SPS, for example.

Figure 3:
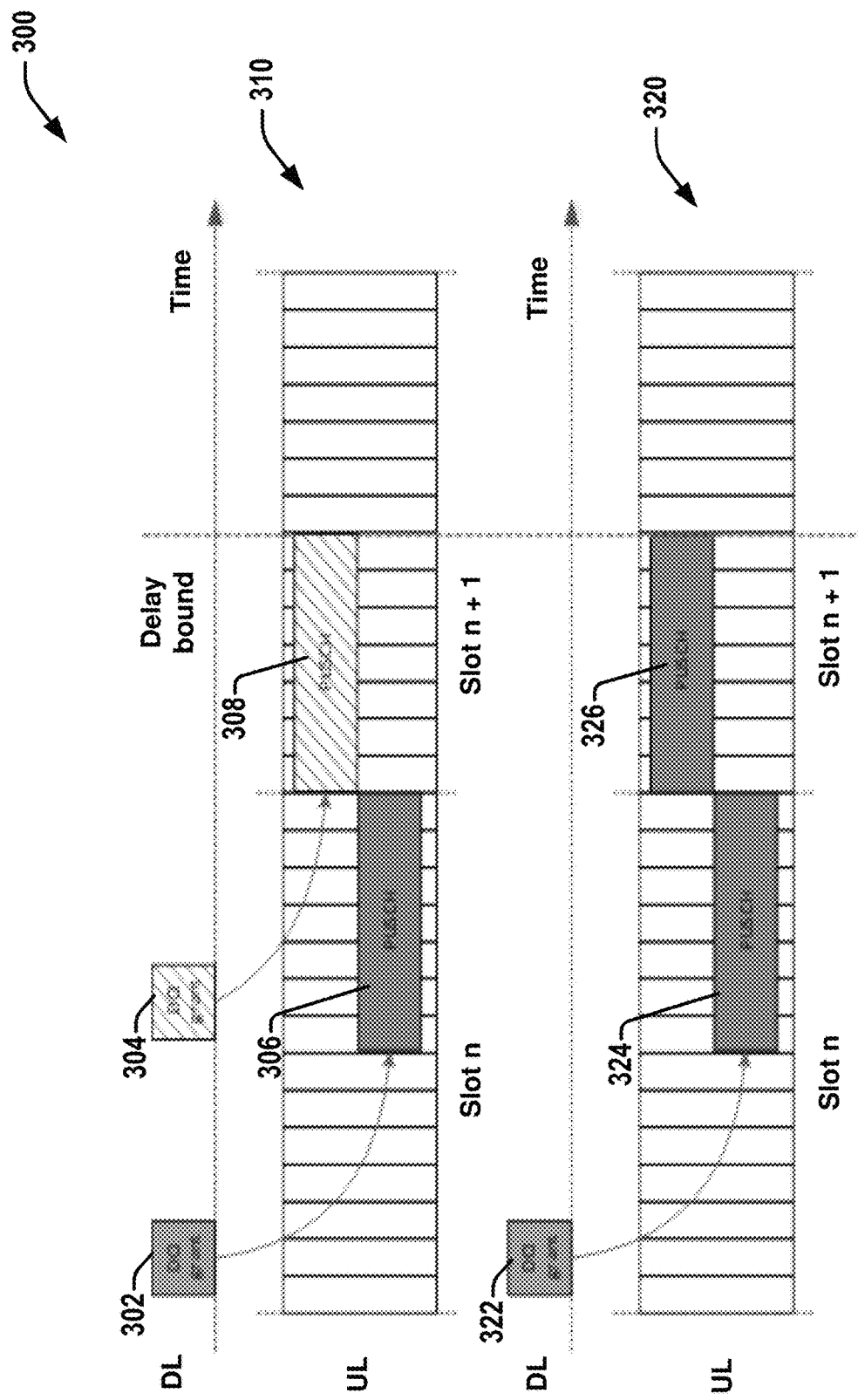
FIG. 3 is another block diagram illustrating another example of back-to-back repetitions indicated dynamically and with separate Downlink Control Informations (DCIs) in accordance with various aspects described herein.

Referring to FIG. 3, illustrated is an example back-to-back repetitions indicated in a dynamic manner as well as separate DCI for each re-transmission without crossing slot boundaries in accordance with various aspects.

In particular, for Ultra-Reliable Low-Latency Communication (URLLC) one of the main demands is to be able to schedule transmission with a very fine granularity of starting position in a slot so that the delay/wait is not too much and the latency budget is not exhausted for the next scheduling opportunity as well as to obtain almost any position in the slot. Similar demands also exist for the ending symbol of the transmission and can be made in terms of a duration. These configurations or configuration parameters can be assimilated in terms of starting position and duration, or starting duration and ending symbol of the overall transmission, for example. In particular, with UL the whole latency budget can be used itself to transmit data. This is why UL is especially important because UL operation is usually power limited, and the larger coverage may only be achieved in this case by a transmission of longer times, where just increasing the bandwidth (BW) is not an option to achieve better coverage. Thus, it is important to utilize as much of the scheduling delay budget as possible. Release 15 does not allow doing very flexible scheduling if transmissions are crossing a slot boundary (e.g., between Slot n and Slot n+1). In various aspects, within a slot, any combination of starting and duration can be scheduled. However, this cannot easily be implemented, as illustrated in FIG. 3, when starting transmission 306 in one slot (n) and continuing transmission 308 in another slot (n+1). The overall machination in two different slots can be described by different starting symbols and duration(s), for example.

Embodiments to enable dynamic aggregation of PUSCH transmissions may improve tradeoff between latency and reliability and overall scheduling flexibility considering the current slotted frame structure in NR. Although legacy PUSCH duration is already quite flexible and could be from 1 symbol to 14 or 12 symbols (for normal cyclic prefix (CP) (NCP) and extended CP (ECP) respectively), it cannot necessarily accommodate cases when relatively short transmission comparable to slot or less than a slot starts in the middle of one slot and ends in another slot. This situation is illustrated in FIG. 3, where a typical transmission 300 is fitted into one slot 310 (top part of the figure), while enhanced transmission may be achieved by aggregation of two transmissions 324 and 326 in different slots 320 (bottom part of the figure). It should be noted, that this may also be achieved by sending two grants 302 and 304, for example; however, this could increase or cause large control overhead, which could lead to UE blocking. Particularly, the control overhead may at least double by sending two grants (e.g., grants 302 and 304).

In particular at FIG. 3, first part or initiation of transmission (e.g., 306 or 324) starts from symbol number 7, if counting from symbol zero, and the second part or initiation of transmission (e.g., 308 or 326) starts from symbol zero, but in the next slot (slot n+1). In contrast, in Release 15 mechanisms by the time a transmission repetition for PUSCH is configured, the repetition happens in the same starting symbol in the next slot (e.g., initiating at symbol 7 at slot n and also at symbol 7 at slot n+1). Obviously, this delays the transmission, as well as the overall transmission, and the delay budget is not as efficient as it could be. The transmission in two different slots 310 and 320 demonstrate two different mechanisms to overcome these issues and increase this efficiency.

In the upper part of FIG. 3, transmissions 310 are scheduled with two different DCIs 302 and 304 that can transmit two different grants and schedule initial transmission 306 and the repetition 308 back-to-back or contiguous to one another in two different slots (n and n+1).

In the lower part of FIG. 3, transmissions 320 are scheduled with a single DCI 324 to transmit granting by one grant that can allocate PUSCH in different starting symbols in different slots, with totally different duration(s). The DCI grant 322 can provide properties to schedule the initial transmission 324 and the repeated transmission 326 with different starting symbols and durations in different slots, or even in the same slot (e.g., n), for example.

In embodiments, the presence of a repetition level bit-field in DCI carrying UL grant (e.g., 322), or activating UL configured grant (CG) Type 2 PUSCH (e.g., 322), can be controlled by semi-static UE-specific radio resource control (RRC) signaling enabling or disabling the dynamic signaling of PUSCH repetitions. For the dynamic grant case, an optionally present enabling flag can be put into "PUSCH-Config" information element while for the CG-PUSCH, "ConfiguredGrant-Config" can be updated with this flag. If not present, then no dynamic repetitions can be assumed by the UE (e.g., 101, 102, 200 or other network device/component). Thus, the information element such as PUSCH config or Configure Grant config could be modified to have a separate Flag to switch between different headers, one being a semi-static repetition factor configuration and the other one being a dynamic.

In embodiments, when dynamic repetitions are enabled, the DCI 322 can carry an X-bit field indicating the number of repeated PUSCH transmissions in an aggregation where X can be 2 bits in order to indicate four different aggregation factors, where one of the values indicates "no repetition". The DCI format with dynamic repetitions can be both DCI format 0_0 and 0_1, which can be monitored in UE-specific search space (USS) addressed to C-RNTI, CS-RNTI or new-RNTI (i.e. MCS-C-RNTI).

In other embodiments, an explicit bit-field can only be limited to DCI format 0_1. For DCI format 0_0 or 0_1, when configured by higher layers or higher layer signaling, the 2-bit Redundancy Version (RV) indicator field can be reinterpreted to indicate the number of repetitions. The number of repetitions could be one from out of 1, 2, 4, and 8; or a number of repetitions from a set of values configured by higher layers or higher layer signaling. In such a case, the RV sequence could follow the sequence 0, 2, 3, 1, with a fixed starting RV index 0.

Alternatively, or additionally, the number of repetitions could be jointly configured to the UE (e.g., 101, 102, 200 or other network device) using UE-specific RRC signaling as part of a time-domain resource allocation table in addition to a starting symbol, a length of PUSCH, and a PUSCH mapping type. Following this, the number of repetitions can be indicated along with other time domain resource allocation RA information using the currently defined time-domain resource assignment bit-field in DCI format 0_0 (using 4 bits) or in DCI format 0_1 (using 0/1/2/3/4 bits, depending on the number of rows in the higher-layer configured time-domain resource allocation table). In order to reduce any negative impact on the flexibility in time-domain allocation possible in Rel-15, the numbers of repetitions could be jointly encoded with the start and length indicator value (SLIV) information (latter indicating start and length of the PUSCH) or certain specific combinations of numbers of repetitions (that are indicated dynamically) and start and length combinations can only be supported by the specifications. Therefore, the repetition factor can be jointly encoded with time domain resource allocation field in the DCI 322. So basically, if this table is configured by RRC and the DCI 322 points to an entry in the table, then functionality of this table can be transmitted so that each entry in the table also conveys the repetition factor together with starting symbol, duration and mapping type. As such, the repetition factor can be provided into the entry, or into each entry of the time domain resource allocation table in RRC, for example.

Even when the UE (e.g., 101, 102, 200 or other network device/component) is configured with slot aggregation with an aggregation factor configured via RRC signaling, the UE can be expected to follow the dynamic indication if also configured and as indicated in the scheduling or activation DCI 322 (e.g., for Type 2 CG PUSCH). In other words, when configured, dynamic indication can over-ride the semi-static configuration for a particular PUSCH transmission or Type 2 cell group (CG) PUSCH transmissions.

Furthermore, the UE (e.g., 101, 102, 200 or other network device/component) can also be dynamically indicated (e.g., using one of the code-points of the dynamic indication of the number of repetitions) whether it should follow the RRC-configured slot-aggregation-factor and associated behavior instead of a dynamically indicated number of repetitions and any associated UE behavior.

In another example, dynamic repetition can be indicated implicitly, such as when a given configured RNTI is used for transmission of a scheduling or activation DCI 322.

In one example, UE (e.g., 101, 102, 200 or other network device/component) can be configured to define that a certain set of UL transmissions can be made with K≥1 repetition. For example, if configured, UE (e.g., 101, 102, 200 or other network device/component) can assume K≥1 repetitions when a re-transmission scheduling DCI is received.

In one example, UE can be configured such that if an initial UL transmission is made with a repetition value K≥1 and a retransmission grant is received after 1≤M<K repetitions are completed, UE can assume first retransmission will be made with K-M repetitions. Similar rules can be extended for subsequent scheduled retransmissions.

When the repetitions are scheduled, they can be performed in two ways: Type A. Slot-based repetitions, i.e. the same time domain allocation can be used in repeated slots, in particular the starting symbol, duration of PUSCH, and PUSCH mapping type in each slot in an aggregation are the same and derived from the time domain resource allocation field of the DCI scheduling PUSCH or activating Type 2 CG-PUSCH; Type B. Back-to-back repetitions (or mini-, miniscule repetitions), i.e. the starting symbol of repetitions other than initial one is derived based on ending symbol of the previous repetition or based on other rule/indication so that repetitions can even be performed within one slot or with minimum/no gap in different slots as illustrated in FIG. 3.

Basically, Type B is a mechanism of repeating the time domain resource allocation on a back-to-back (or contiguous) basis, instead of on a slot basis, so that the time domain resource allocation gives a starting symbol and duration of the initial transmission 324 and repeated starting from the next available symbol (e.g., symbol 0 in slot n+1 with repetition 326, in the next slot, or within a slot in other examples), even it may be done in the same slot, so that the duration is given by the duration of the initial transmission; however, the starting symbol of repetition is given by looking for the next available symbol of the previous repetition. Thus, Type B can be different from the Type A repetition. Type B repetition can also be seen as an example in FIG. 3 with the transmission 310 and 320, for example, where the second part or repetition 308 or 326 is transmitted in the next symbol after the first slot n, and it has the same duration, but the starting symbol is calculated based on or just after the last symbol of the previous repetition contiguously.

Both types (Type A/Type B) can be valid and beneficially utilized for URLLC use cases and therefore can be supported for configuration together. In that case, switching between the two types of repetitions can be done dynamically or semi-statically. In embodiments, a UE can be semi-statically configured by RRC signaling to follow either type A or type B PUSCH repetition defined above. The configuration signaling information element can be conveyed as part of "PUSCH-Config" for dynamically scheduled PUSCH transmission or as part of "ConfiguredGrant-Config" for CG-PUSCH transmissions.

In embodiments, the repetition type B can be implicitly enabled based on other parameters such as a PUSCH starting symbol and duration, e.g. if starting symbol is larger than 's0' and duration is smaller than 'd0', then UE follows type B repetition. Alternatively, or additionally, whether type A or type B repetition is applied can be explicitly indicated via DCI as part of an existing field or as a separate bitfield, wherein the latter would require 1 additional bit in DCI. In case of the existing field usage, the time domain resource allocation field pointing to RRC configured table of 'PUSCH-TimeDomainResourceAllocation' information elements can also provide the repetition type. In particular, each instance of 'PUSCH-TimeDomainResourceAllocation' can include also an enumerated or boolean optional parameter indicating {typeA, typeB} repetition option. If not present, the legacy type A repetition behavior can be assumed. An example of such RRC message modified from Rel-15 version is illustrated in the box below with red-underlined text indicating the changes comparing to current message content. An example RRC message modification including the repetition mapping type is shown by message box 1 400 of FIG. 4.

The Message Box 1 400 can be an RRC Message Modification including the repetition mapping type.

In embodiments, type A and B repetitions can be implicitly associated to PUSCH mapping types A and B respectively.

In embodiments, the type B repetition can only be allowed for the case of PUSCH aggregation factor 2 so that first repetition is transmitted in the end of the first slot (i.e. PUSCH transmission ends at the slot boundary or a few symbols before the slot boundary) and a second repetition is transmitted in the beginning of the second slot (i.e. PUSCH starts at the slot boundary or a few symbols after the slot boundary). In this case, the length of the second transmission can be equal to the length indicated by the time domain resource allocation field in DCI 322, for example, and a starting position can be derived as the first UL symbol of the next slot.

Figure 5:
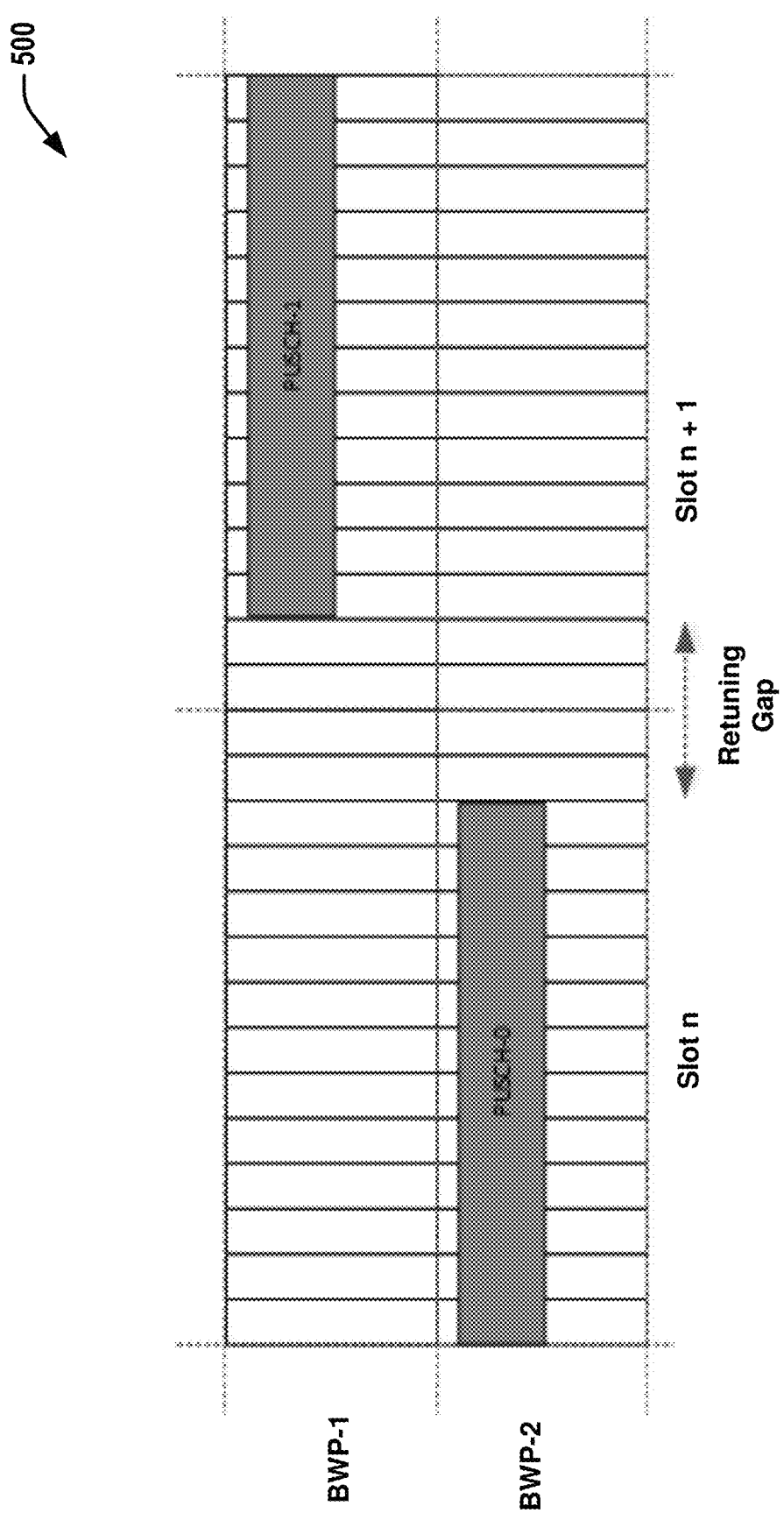
FIG. 5 is a block diagram illustrating inter-bandwidth part hopping for repetitions according to various aspects/embodiments described herein.

Referring to FIG. 5, illustrated is an example transmission with frequency hopping across multiple bandwidth parts (BWPs). An objective of potential enhancements to PUSCH transmission for URLLC can be to utilize all sources of diversity including frequency diversity. When UE (e.g., 101, 102, 200 or other network device/component) has relatively limited RF capability, i.e. UE RF bandwidth is smaller than system bandwidth then depending on channel coherency bandwidth it can be beneficial to organize repeated transmissions of PUSCH across bandwidth parts of smaller bandwidth even assuming retuning time is needed to switch between BWPs.

In embodiments, a UE (e.g., 101, 102, 200 or other network device/component) can be configured semi-statically to perform alternating of bandwidth parts every 'N' repetitions (N=1, 2, . . . , K/2) if a frequency hopping enabling flag is indicated in DCI or semi-statically configured in case of CG-PUSCH transmission. Further embodiments, the frequency hopping offset can not be applied when transitioning to another BWP, i.e. RB offset in a given BWP is the same as in the BWP for hopping. Or, the frequency hopping offset can be applied together with a BWP change.

Such behavior can be achieved by extending the current mechanism of RRC-configured frequency hopping offsets.

In one example, each semi-statically configured frequency hopping offset value can be associated with particular type of behavior for inter-BWP hopping and particular set of BWPs to hop over. In particular, the first frequency hopping offset can be associated with disabled inter-BWP hopping while the second frequency hopping offset can be associated with enabled inter-BWP hopping and so on. In this case, when UE detects DCI with frequency hopping (FH) enabled and with an index of FH offset it can derive the particular FH mode.

Alternatively, in one example of inter-BWP hopping, when inter-BWP hopping is enabled, the FH offset can be interpreted in absolute RB indexing without wrapping (modulo operation) in particular BWP. As illustrated in the equation below, modulo operation can be done using $N_{SystemBW}^{size}$ which is the full UL system BW in this context. In that case, depending on particular FH offset value the UE (e.g., 101, 102, 200 or other network device/component) could need to hop to another BWP. However, UE can not be expected to be configured with combination of FH offset and RB assignment so that resulting PUSCH transmission spans across its configured BWPs i.e. not fully contained in either of its BWPs.

$$RB_{start} = \begin{cases} RB_{start} & \text{First hop} \\ (RB_{start} + RB_{offset}) \bmod N_{SystemBW}^{size} & \text{Second hop} \end{cases}$$

In order to control retuning gap overhead which is unavoidable during BWP switch, the number of repetitions within one hop 'N' can be defined as a half of total repetitions so that only one BWP switch during repeated PUSCH is performed (excluding retuning back to active BWP).

In one example, a multi-bit flag is considered, e.g., indicated via the DCI, where each bit can indicate whether the intra-slot hopping is enabled or disabled, when the inter-BWP hopping is enabled. In other words, on top of the BWP hopping, intra slot hopping within the respected BWP is considered. This explicit indication allows to dynamically enable hopping in one BWP but not necessarily in the other. Currently, the UE follows the configuration for each BWP when transmitting in that particular BWP.

Figure 6:
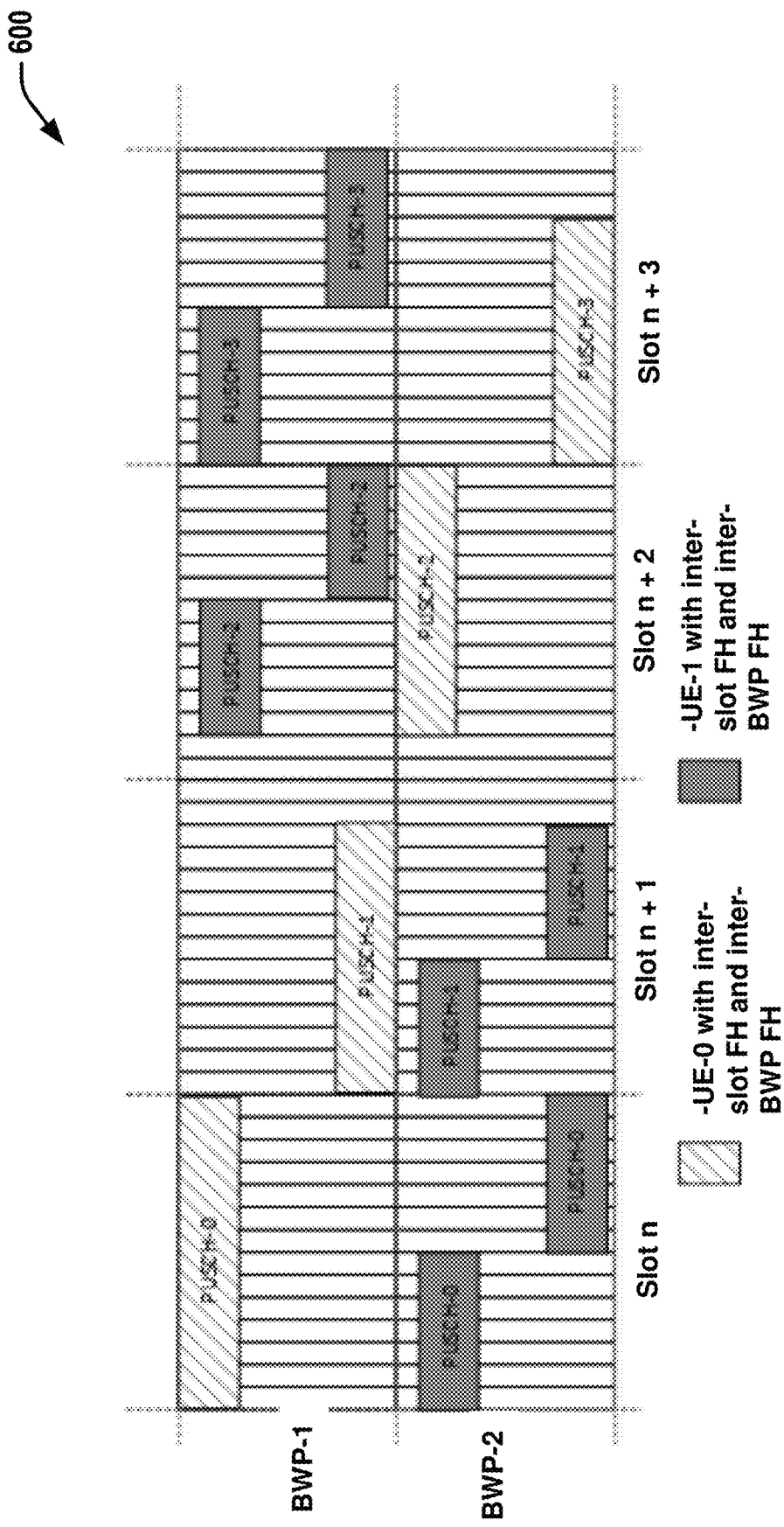
FIG. 6 is a block diagram illustrating inter-bandwidth part hopping with intra-slot and inter-slot frequency hopping (FH) for repetitions according to various aspects/embodiments described herein.

In embodiments, BWP change can only be inter-slot, i.e. performed on slot boundary while the configured frequency hopping mode {inter-slot or intra-slot} currently available in NR can be applied within currently active BWP based on configuration 600. This is illustrated in FIG. 6, where UE-0 is configured with inter-slot FH and UE-1 is configured with intra-slot FH.

In embodiments, the UE (e.g., 101, 102, 200 or other network device/component) can follow "PUSCH-Config" and "ConfiguredGrant-Config" parameters for PUSCH transmission in a given BWP associated with this BWP, e.g. numerology, power control, Demodulation Reference Signal (DMRS), waveform, etc. However, this can not bring many benefits and can be restricted so that UE is not expected to change at least some parameters (e.g. numerology) when performing inter-BWP frequency hopping.

The inter-BWP hopping can be generalized to multiple BWPs by using either deterministic rule or pseudo-random hopping sequence. A table can be provided to a UE (e.g., 101, 102, 200 or other network device/component) where index of different hopping sequences or pattern can be stored. UE specific RRC signaling or DCI can indicate an index to the UE. This however can not bring further benefits considering most of the frequency diversity can be extracted with hopping between two sufficiently separated positions and accounting for the growing overhead for each BWP retuning.

The retuning gap can be accommodated by assuming that UE can do rate-matching or dropping of S_0 symbols in the end of the slot before BWP retuning and S_1 symbols in the start of the slot after BWP retuning, where (S_0+S_1)≥ (number of symbols for retuning). In one example, the values of S_0 and S_1 can be fixed in specification as a function of numerology and other parameters or be configured not smaller than minimum values expected from a UE based on its capability.

Alternatively, gNB (e.g., 111, 112, 200 or other network device/component) can take care of retuning gaps by granting PUSCH shorter than full slot duration to accommodate the retuning overhead. In this case UE (e.g., 101, 102, 200 or other network device/component) is not expected to be scheduled w/o gaps and inter-BWP FH.

Further, Rel-16 and beyond UEs can indicate need for shorter retuning gaps of order of 100 us or less that can facilitate efficient support of inter-BWP frequency hopping.

In other embodiments, a transport block size (TBS) scaling factor can be configured for PUSCH/physical downlink shared channel (PDSCH), as described below.

It is also envisioned, that currently possible lowest modulation and coding rate can not provide single-shot Block Error Rate (BLER) performance for new URLLC use cases, for example, requiring packet error rate of 10-6 or 10-9. In order to provide forward compatible mechanism which can allow to achieve any value of low SE, instead of introducing new Modulation and coding scheme MCS tables, a mechanism of TBS scaling can be used.

In such TBS scaling embodiments, a UE (e.g., 101, or the like) can be provided with TBS scaling factor for PDSCH and/or PUSCH scheduled by a Cell Radio Network Temporary Identifier (C-RNTI) or a Configured Scheduling (CS-RNTI) or a new-RNTI (i.e. Modulation Coding Scheme (MCS) MCS-C-RNTI) which is applied to calculation of N_info bits in the TBS determination procedure defined in TS 38.214 as follows:

N_info=S·N_RE·R·Q_m·vm where S is the configured scaling factor, 0<S≤1.

ULLRC typically requires lowest transmission efficiency of a given transmission to guarantee packet error rate of URLLC applications, which are much less than the ones considered for enhanced Mobile Broadband (eMBB) applications, for example, usually around $10^{-1}$ or 10 percent packet error rate. However, ULLRC at $10^{-5}$ BLER is usually considered a packet error rate starting from $10^{-5}$ and if we translate it to reliability it is like $10^{-5}$ to (and) $10^{-9}$. Thus, there can be a need for a design of new MCS tables to support slowest spectrum efficiency of transmission. A table was designed for DL and one for UL in Release 15 for ULLRC use cases, for example, but it was mainly optimized for one given packet error rate of $10^{-5}$. Thus, in a subsequent Release another use case could be introduced and required $10^{-6}$ or $10^{-7}$, then someone could request a new access table designed into one. And if this requires designing a new table each release, then another mechanism called TBS scaling, for example, could be configured to enable such a scaling. The TBS scaling can also be applied to shared channel transmission, for example, scaled by C- or CS-RNTI or by MCS-C-RNTI. And the scaling itself could be introduced semi-statically by RRC or dynamically by DCI.

In embodiments, the scaling factor can be indicated explicitly in DCI (e.g., DCI 322) where the presence of this bit-field is subject to UE-specific RRC configuration enabling the TBS scaling procedure. Alternatively, the TBS scaling factor can be semi-statically associated with a given monitored RNTI and/or DCI format (0_0 or 0_1 or 1_0 or 1_1) monitored in UE specific Search Space (USS) or Common Search Space (CSS), where the association is provided per BWP and per uplink UL and downlink DL separately. The possible values of scaling factor can be tabulated in specification and at least support the following set: {1, 0.5, 0.25, 0.2, 0.1}, for example.

In other embodiments, as described below, another area for enhancements is the CG-PUSCH transmission, such as with Configured Grant (CG) PUSCH enhancements. Configured grant is considered important for ULLRC applications in NR because it eliminates the latency caused by transmission and processing of dynamic grant of a DCI, and data can be transmitted without requesting a grant and exhausting latency budget for requesting the resources.

Currently, most transmission and resource allocation parameters can be updated dynamically for Type 2 CG PUSCH, with one exception being the periodicity of the resource configuration in time domain.

Configured grant (CG) is introduced for NR as two types. One is configuration by semi static signaling by RRC and the other second one is a combination of RRC signaling and activation by DCI.

In embodiments, the DCI format for activation or updating can be used to update the periodicity of the transmission opportunities. In case the periodicity is updated dynamically, the UE (e.g., 101, 102, 200, or other network device/component) assumes the new periodicity to apply subsequent to the first transmission opportunity following the reception of such activation or updating DCI format. Such indication can be achieved by reinterpreting one or more of: the Hybrid Automatic Repeat Requesting process ID (HARQ PID) field, or the RV field for the activation/updating DCI, with CRC scrambled with CS-RNTI. Jere an application to the Type 2 Configured grant is proposed as a first enhancement where there is dynamic update of some parameter(s) that are not configurable by DCI. For example, now type 2 CG has periodicity configured by RRC and further DCI can also change this periodicity and be signaled by DCI.

In embodiments, a UE (e.g., 101, 102, 200, or other network device/component) can be configured to transmit PUSCH according to Type 1 procedures and to monitor for deactivation DCI with CRC masked by CS-RNTI. When received, the UE shall release the corresponding configuration in a given BWP. Type 1 is now RRC configured and activated/deactivated. Thus, URLLCC could be enhanced by DCI deactivation because deactivation by RRC takes a longer time, usually like 10 ms; however, if DCI is used for deactivation it could deactivated by DCI while activated by RRC, and make it faster than deactivation by RRC.

In other embodiments, a UE (e.g., 101, 102, 200, or other network device/component) can be configured with multiple configured grant configurations conveying resource allocation and transmission parameters. One resource configuration is different from the other when at least one parameter is different. A resource configuration can comprise one or more of the following parameters: Time-frequency resource; hopping and/or repetition pattern/number; periodicity; DMRS; RV; MCS; Power control parameter, etc. Basically any parameters for transmission could be different for configuration and the UE can be configured with more than one such configurations. One approach is to have only one of them activated at a time. Alternatively, or additionally, another approach is to activate more than one at a time so that the UE can choose one that is more appropriate for a given transmission.

In one example, a UE (e.g., 101, 102, 200, or other network device/component) can only be activated with one configuration when operating in Type 1 CG-PUSCH. The UE can be configured to receive L1 signaling or medium access control (MAC) CE signaling to switch from one resource configuration to another. The L1 signaling can be UE specific DCI or group-DCI where a UE (e.g., 101, 102, 200, or other network device/component) is mapped to a field containing UE-specific information. In one example, the DCI or MAC CE signaling can indicate an index of the configuration to the UE. UE can assumed the updated resource configuration for subsequent configured grant PUSCH transmission. In another example, a UE (e.g., 101, 102, 200, or other network device/component) can be activated with N configurations:

In case of Type 1 configured grant, all the indicated by RRC configurations can be assumed activated.

In case of Type 2 configured grant, the configurations can either be activated/deactivated altogether by single DCI or by separate DCIs one-by-one. In the latter case, the DCI for activation/deactivation needs to convey the configuration index for differentiation. Further, since the timing offset for type 2 configured grant transmission is given by DCI, considering multiple DCIs to enable multiple configurations—one for each configuration to give a timing offset—can be a more convenient approach. In order to keep the monitored DCI size the same as for usual scheduling, one or several existing DCI fields can be re-interpreted as CG-PUSCH configuration index. For example, log 2(N) least a significant bit (LSB) or most significant bit (MSB) bits of HARQ-ID field can be utilized. In another example, all-zero HARQ process ID is used to send activation/de-activation. If configured with multiple configurations, a UE can check all configured indexes to validate activation/deactivation of particular configuration. Alternatively, the 24-bit CRC of DCI for activation/deactivation of particular configuration can be masked with {log 2(N) bit+16 bit} where the first part is the configuration index and the second part is CS-RNTI.

In order to utilize HARQ ID, some other fields in DCI can need to fixed to a known value in order to keep false alarm rate unchanged.

In yet another example, the activation for a UE can be realized per configuration, while the release/de-activation can be realized for all the configurations at a time.

The CG configured confirmation MAC CE can also be handled if you have more than one configuration. The problem here is that the UE (e.g., 101, 102, 200, or other network device/component) needs to confirm every activation and every deactivation by generating a media access control MAC control element (CE) that indicates confirmation of successful reception of activation or deactivation information from the gNB (e.g., 111, 200). This is needed to understand whether the UE has really decoded the DCI for activation/deactivation. Then if we have more than one configuration it is probably such that the gNB needs to understand which configuration activation/deactivation the UE has been received successfully. Thus, the CG grant MAC CE could have some configuration about the confirmation index that was activated/deactivated. Thus, the MAC CE could be enhanced to carry such information about which configuration is activated/deactivated by the UE. There are a few mechanisms, for example, configuration index, or a vector configuration of indexes or a bit map of a configuration index that could be used here.

When multiple configurations are configured, handling of "configured grant confirmation MAC CE" can need to be clarified or updated. According to currently specified behavior, the grant confirmation is sent when either activation or deactivation signal is detected. In case if each configuration is activated by a separate DCI, the confirmation can need to be sent for each configuration. It is expected, that the MAC CE is signaled in PUSCH transmitted in the resources related to particular configuration. In case if PUSCH resources of different configurations overlap in time, it can not be possible to send multiple PUSCH (and therefore multiple MAC CE) simultaneously.

Figure 7:
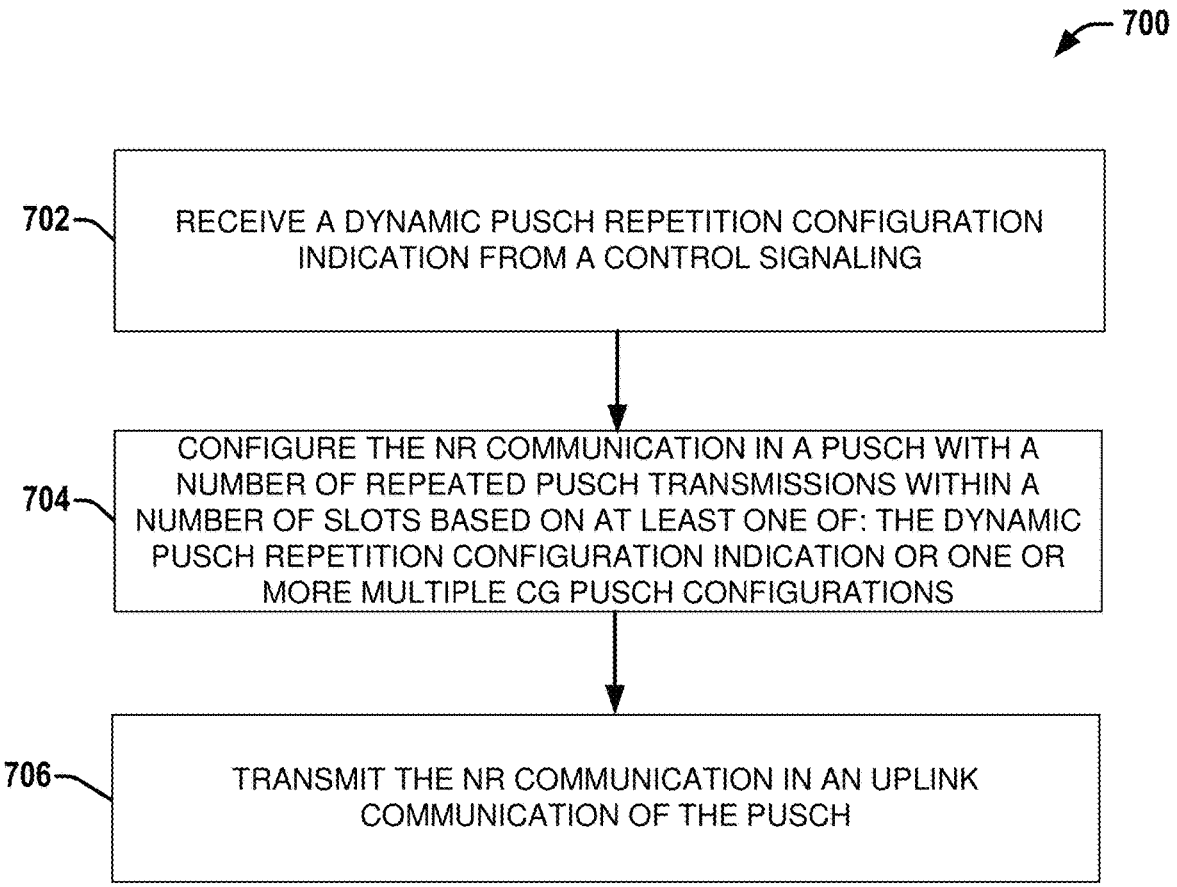
FIG. 7 is a block diagram illustrating an example process flow according to various aspects/embodiments described herein.

In that context, in one embodiment, a new "configured grant confirmation" MAC CE format addressed by new LCID can be defined which is not a zero-size but carries indication which configuration is confirmed. This can be a bitmap of size of number of configurations to be confirmed simultaneously or the number of configurations of Type 2 CG PUSCH configured to the UE. Alternatively, the new MAC CE can carry one or more indices of the CG PUSCH configuration. Note that, with support of multiple CG PUSCH configurations, each configuration can also include a Configuration Index. The indexing of configurations can be defined within each CG PUSCH type or across all CG PUSCH configurations provided to the UE. In case of multiple confirmations, MAC CEs can be multiplexed Referring to FIG. 7, illustrated an example process flow 700 for a network device (e.g., a user equipment (UE), a new radio NB (gNB), 5GC component or the like) can process, generate, or monitor new radio (NR) communication via a 5G network system (5GS) to perform operations for URLLC.

The process flow 700 initiates at 702 with receiving a dynamic PUSCH repetition configuration indication from a control signaling.

At 704, the process flow 700 includes configuring the NR communication in a PUSCH with a number of repeated PUSCH transmissions within a number of slots (e.g., one or two slots) based on at least one of: the dynamic PUSCH repetition configuration indication or one or more multiple CG PUSCH configurations.

At 706, the process flow 700 includes transmitting the NR communication in an uplink communication of the PUSCH.

As it is employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor can also be implemented as a combination of computing processing units.

Examples can include subject matter such as a method, means for performing acts or blocks of the method, at least one machine-readable medium including instructions that, when performed by a machine (e.g., a processor with memory, an application-specific integrated circuit (ASIC), a field programmable gate array (FPGA), or the like) cause the machine to perform acts of the method or of an apparatus or system for concurrent communication using multiple communication technologies according to embodiments and examples described herein.

A first example is an apparatus configured to be employed in a User Equipment (UE) for a new radio (NR) communication comprising: one or more processors configured to: process a dynamic Physical Uplink Shared Channel (PUSCH) repetition configuration indication from control information signaling; and configure the NR communication in a PUSCH with a number of repeated PUSCH transmissions within a number of slots based on the dynamic PUSCH repetition configuration indication; a radio frequency (RF) interface, configured to provide, to RF circuitry, data for transmitting the NR communication.

A second example can include the first example, wherein the one or more processors are further configured to determine the dynamic PUSCH repetition configuration indication from a Downlink Control Information (DCI) based on a repetition level bit-field in DCI that carries a UL grant or an activation of a UL configured grant Type 2 PUSCH, that is controlled by semi-static UE-specific RRC signaling for enabling or disabling the dynamic signaling of PUSCH repetitions.

A third example can include the first or second example, wherein the one or more processors are further configured to in response to dynamic repetitions being enabled, the control information signaling comprises a DCI configured with an X-bit field indicating the number of repeated PUSCH transmissions in an aggregation, wherein X comprises 2 bits in order to indicate four different aggregation factors, where one of the values indicates "no repetition".

A fourth example can include any one of the first through third examples, wherein the one or more processors are further configured to reinterpret a 2-bit Redundancy Version (RV) indicator field to determine the number of repeated PUSCH transmissions based on higher layer signaling for DCI format 0_0 or 0_1.

A fifth example can include any one of the first through fourth examples, wherein the one or more processors are further configured to determine the number of repeated PUSCH transmissions from UE-specific RRC signaling of a time-domain resource allocation table, where an entry of the time-domain resource allocation table is jointly configured with the number of repeated PUSCH transmissions in addition to a starting symbol, a length of PUSCH, and a PUSCH mapping type.

A sixth example can include any one of the first through fifth examples, wherein the one or more processors are further configured to determine whether to utilize an RRC-configured slot-aggregation-factor and the any associated behavior, or utilize the number of repeated PUSCH transmissions and any associated UE behavior from a dynamic signaling based on a code-point of the dynamic PUSCH repetition configuration indication of the number of the repeated PUSCH transmissions.

A seventh example can include any one of the first through sixth examples, wherein the one or more processors are further configured to configure the number of repeated PUSCH transmission as a Type A PUSCH repetition or a Type B PUSCH repetition based on a semi-static indication by a Radio Resource Control (RRC) signaling, wherein the Type A PUSCH repetition comprises slot-based repetitions, wherein a same time domain allocation is used in repeated slots including a starting symbol, a duration of PUSCH, and a PUSCH mapping type and derived from a time domain resource allocation field of a DCI scheduling PUSCH or activating Type 2 Configured Grant (CG)-PUSCH, and wherein the Type B PUSCH repetition comprises back-to-back repetitions so that a starting symbol of repetitions other than initial one is derived based on an ending symbol of a previous repetition or based on another indication so that the back-to-back repetitions are within one slot or contiguously in different slots.

An eighth example can include any one of the first through seventh examples, wherein the one or more processors are further configured to configure the NR communication in the PUSCH based on one or more multiple configuration grant (CG) PUSCH configurations conveying resource allocation and transmission parameters for the NR communication as a ultra-reliable low latency communication (URLLC).

A ninth example can include any one of the first through eighth examples, wherein the one or more processors are further configured to transmit the PUSCH based on a Type 1 CG and monitor for deactivation of the one or more multiple CG PUSCH configurations in response to a deactivation indication in DCI, and in response to receiving the deactivation indication in the DCI, releasing a corresponding CG PUSCH configuration in a bandwidth part (BWP).

A tenth example can include any one of the first through ninth examples, wherein the one or more processors are further configured to receive L1 signaling or MAC CE signaling to switch from one resource configuration to another, wherein the L1 signaling is a UE specific DCI or a group-DCI where the UE is mapped to a field containing UE-specific information.

An eleven example can include any one of the first through tenth examples, wherein the one or more processors are further configured to activate the one or more multiple CG PUSCH configurations in response to being indicated by RRC signaling for Type 1 CGs, and activate/deactivate the one or more multiple CG PUSCH configurations in response to being indicated altogether by a single DCI or separately by different DCIs for Type 2 CGs.

A twelfth example can be a computer readable storage device storing executable instructions that, in response to execution, cause one or more processors of User Equipment (UE) for a new radio (NR) communication via a 5G network system (5GS) to perform operations, the operations comprising: receiving a dynamic PUSCH repetition configuration indication from a control signaling; configuring the NR communication in a PUSCH with a number of repeated PUSCH transmissions within a number of slots based on at least one of: the dynamic PUSCH repetition configuration indication or one or more multiple CG PUSCH configurations; and transmitting the NR communication in an uplink communication of the PUSCH.

A thirteenth example can include the twelfth example, wherein the operations further comprise: receiving the one or more multiple configuration grant (CG) PUSCH configurations conveying resource allocation and transmission parameters for the NR communication as a ultra-reliable low latency communication (URLLC).

A fourteenth example can include the thirteenth example or the twelfth example, wherein the operations further comprise: activating/deactivating the one or more multiple CG PUSCH configurations altogether in response to being indicated by a single DCI or separately by different DCIs for Type 2 CGs.

A fifteenth example can include the twelfth through thirteenth example, wherein the operations further comprise: determining activation/deactivation of the one or more multiple CG PUSCH configurations based on one or more CG-PUSCH configuration indexes, wherein log 2(N) least significant bit (LSB) or most significant bit (MSB) bits of a Hybrid Automatic Repeat Request ID (HARQ-ID) field indicate a corresponding CG-PUSCH configuration index for an N configuration of the one or more multiple CG PUSCH configurations.

A sixteenth example can include the twelfth through fifteenth example, wherein the operations further comprise: determining activation/deactivation of the one or more multiple CG PUSCH configurations based on a 24-bit CRC of DCI masked with {log 2(N) bit+16 bit} with a first part being a configuration index and a second part being Configured Scheduling Radio Network Temporary Identifier (CS-RNTI).

A seventeenth example can include the twelfth through sixteenth example, wherein the operations further comprise: configuring a bitmap size number of the one or more multiple CG PUSCH configurations to be confirmed simultaneously or a number of configurations of Type 2 CG PUSCH configured to the UE, wherein a configured grant confirmation MAC CE format is addressed by Logical Channel ID (LCID) which is not a zero-size but carries indication which configuration of the one or more multiple CG PUSCH configurations is confirmed.

An eighteenth example can include the twelfth through seventeenth example, wherein the MAC CE carries one or more indices of a CG PUSCH configuration, and each configuration of the one or more multiple CG PUSCH configurations includes a Configuration Index defined within each CG PUSCH type or across all CG PUSCH configurations provided to the UE.

A nineteenth example can be an apparatus configured to be employed at a next generation NodeB (gNB) for a new radio (NR) communication in a 5G network system (5GS) comprising: one or more processors configured to: enable multiple PUSCH repetitions within a number of slots for the NR communication; configure a dynamic physical uplink shared channel (PUSCH) repetition indication of the multiple PUSCH repetitions within the number of slots; and communicate downlink control information (DCI) that provides the dynamic PUSCH repetition indication to enable the NR communication in a PUSCH to include at least one of: the multiple PUSCH repetitions within the number of slots, or one or more multiple configuration grant (CG) PUSCH configurations; a radio frequency (RF) interface, configured to provide, to RF circuitry, data for transmitting or receiving the NR communication based on the dynamic PUSCH repetition indication.

A twentieth example can include the nineteenth example, wherein the one or more processors are further configured to communicate the dynamic PUSCH repetition configuration indication from a Downlink Control Information (DCI) based on a repetition level bit-field in DCI that carries a UL grant, and the NR communication comprises an ultra-reliable low-latency communication (URLLC).

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product can include a computer readable medium having one or more instructions or codes operable to cause a computer to perform functions described herein.

Communications media embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

An exemplary storage medium can be coupled to processor, such that processor can read information from, and write information to, storage medium. In the alternative, storage medium can be integral to processor. Further, in some aspects, processor and storage medium can reside in an ASIC. Additionally, ASIC can reside in a user terminal. In the alternative, processor and storage medium can reside as discrete components in a user terminal. Additionally, in some aspects, the processes and/or actions of a method or algorithm can reside as one or any combination or set of codes and/or instructions on a machine-readable medium and/or computer readable medium, which can be incorporated into a computer program product.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature can have been disclosed with respect to only one of several implementations, such feature can be combined with one or more other features of the other implementations as can be desired and advantageous for any given or particular application.

What is claimed is:

1. A baseband processor configured to, when executing instructions stored in a memory, perform operations comprising:
   receiving one or more Type 2 configured grant (CG) Physical Uplink Shared Channel (PUSCH) configurations;
   receiving User Equipment (UE) specific Radio Resource Control (RRC) signaling to configure a time-domain resource allocation table, wherein an entry of the time-domain resource allocation table is jointly configured with a number of repeated PUSCH transmissions in addition to a starting symbol, a length of PUSCH, and a PUSCH mapping type;
   receiving a downlink control information (DCI) transmission to activate the one or more Type 2 CG PUSCH configurations, wherein the DCI includes a field pointing to the entry of the time-domain resource allocation table; and
   generating, for transmission via radio frequency (RF) circuitry and in response to the DCI, the number of repeated PUSCH transmissions within a number of slots based on the one or more Type 2 CG PUSCH configurations and the entry of the time-domain resource allocation table.

2. The baseband processor of claim 1, wherein the operations further comprise receiving RRC signaling to enable dynamic signaling of PUSCH repetitions.

3. The baseband processor of claim 1, wherein the operations further comprise reinterpreting a 2-bit Redundancy Version (RV) indicator field in the DCI to determine the number of repeated PUSCH transmissions in response to being configured by higher layer signaling, wherein the DCI comprises a DCI format 0_0 or 0_1.

4. The baseband processor of claim 1, wherein the DCI includes a time-domain resource assignment field pointing to the entry of the time-domain resource allocation table.

5. The baseband processor of claim 1, wherein the operations further comprise receiving RRC signaling indicating whether to generate the number of repeated PUSCH transmissions as a Type A PUSCH repetition or a Type B PUSCH repetition.

6. The baseband processor of claim 5, wherein:
   the Type A PUSCH repetition comprises slot-based repetitions having a same time domain allocation in repeated slots, wherein the time domain allocation includes a starting symbol, duration, and mapping type of the PUSCH and is derived from a time domain resource allocation field of the DCI; and
   the Type B PUSCH repetition comprises back-to-back repetitions, wherein a starting symbol of the back-to-back repetitions other than an initial repetition is derived based on an ending symbol of a previous repetition, and wherein the back-to-back repetitions are contiguous within one or more slots.

7. The baseband processor of claim 1, wherein the one or more Type 2 CG PUSCH configurations convey resource allocation and transmission parameters for the number of repeated PUSCH transmissions as an ultra-reliable low latency communication (URLLC).

8. The baseband processor of claim 1, wherein the operations further comprise: receiving a deactivation indication in DCI, and in response to receiving the deactivation indication in the DCI, releasing a corresponding CG PUSCH configuration in a bandwidth part (BWP).

9. The baseband processor of claim 1, wherein the operations further comprise receiving L1 signaling or medium access control (MAC) control element (MAC CE) signaling to switch from a first Type 2 CG PUSCH configuration of the one or more Type 2 CG PUSCH configurations to a second Type 2 CG PUSCH configuration of the one or more Type 2 CG PUSCH configurations, wherein the L1 signaling includes UE specific DCI or a group-DCI where the UE is mapped to a field of the group-DCI containing UE-specific information.

10. The baseband processor of claim 1, wherein a total number of bits in the field of the DCI is based on a total number of entries in the time-domain resource allocation table.

11. A non-transitory computer readable storage device storing executable instructions that, in response to execution, cause one or more processors of User Equipment (UE) to perform operations comprising:
receiving one or more Type 2 configured grant (CG) Physical Uplink Shared Channel (PUSCH) configurations;
receiving UE specific Radio Resource Control (RRC) signaling to configure a time-domain resource allocation table, wherein an entry of the time-domain resource allocation table is jointly configured with a number of repeated PUSCH transmissions in addition to a starting symbol, a length of PUSCH, and a PUSCH mapping type;
receiving a downlink control information (DCI) transmission to activate the one or more Type 2 CG PUSCH configurations, wherein the DCI includes a field pointing to the entry of the time-domain resource allocation table; and
generating, for transmission via radio frequency (RF) circuitry and in response to the DCI, the number of repeated PUSCH transmissions within a number of slots based on the one or more Type 2 CG PUSCH configurations and the entry of the time-domain resource allocation table.

12. The non-transitory computer readable storage device of claim 11, wherein the one or more Type 2 CG PUSCH configurations convey resource allocation and transmission parameters for the number of repeated PUSCH transmissions as an ultra-reliable low latency communication (URLLC).

13. The non-transitory computer readable storage device of claim 11, wherein the operations further comprise receiving one or more DCIs to activate the one or more Type 2 CG PUSCH configurations respectively.

14. The non-transitory computer readable storage device of claim 11, wherein the operations further comprise:
configuring a bitmap size number of the one or more Type 2 CG PUSCH configurations to be confirmed simultaneously or a number of configurations of the Type 2 CG PUSCH configured to the UE, wherein a configured grant confirmation medium access control (MAC) control element (MAC CE) format is addressed by Logical Channel ID (LCID) having a non-zero size and carries an indication of which configuration of the one or more Type 2 CG PUSCH configurations is confirmed.

15. The non-transitory computer readable storage device of claim 14, wherein a MAC CE signaling carries one or more indexes of one or more CG PUSCH configuration, and wherein each configuration of the one or more Type 2 CG PUSCH configurations includes a Configuration Index defined within each CG PUSCH type or across all CG PUSCH configurations provided to the UE.

16. The non-transitory computer readable storage device of claim 11, wherein a total number of bits in the field of the DCI is based on a total number of entries in the time-domain resource allocation table.

17. The non-transitory computer readable storage device of claim 11, wherein the DCI includes a time-domain resource assignment field pointing to the entry of the time-domain resource allocation table.

18. A baseband processor configured to, when executing instructions stored in a memory, perform operations comprising:
generating, for transmission via radio frequency (RF) circuitry, one or more Type 2 configured grant (CG) Physical Uplink Shared Channel (PUSCH) configurations;
generating, for transmission via the RF circuitry, User Equipment (UE) specific Radio Resource Control (RRC) signaling to configure a time-domain resource allocation table, wherein an entry of the time-domain resource allocation table is jointly configured with a number of repeated PUSCH transmissions in addition to a starting symbol, a length of PUSCH, and a PUSCH mapping type;
generating a downlink control information (DCI) for transmission via the RF circuitry, wherein the DCI includes an indication to activate the one or more Type 2 CG PUSCH configurations and a field pointing to the entry of the time-domain resource allocation table; and
receiving a number of repeated PUSCH transmissions within a number of slots based on the one or more Type 2 CG PUSCH configurations and the entry of the time-domain resource allocation table.

19. The baseband processor of claim 18, wherein a total number of bits in the field of the DCI is based on a total number of entries in the time-domain resource allocation table.

20. The baseband processor of claim 18, wherein the DCI includes a time-domain resource assignment field pointing to the entry of the time-domain resource allocation table.

* * * * *